United States Patent [19]

Geyer

[11] 4,167,286

[45] Sep. 11, 1979

[54] ENTRANCE STRUCTURE FOR A MULTI-PASSENGER VEHICLE

[75] Inventor: Ludwig Geyer, Puchheim, Fed. Rep. of Germany

[73] Assignee: Maschinenfabrik Augsburg-Nuernberg Aktiengesellschaft, Munich, Fed. Rep. of Germany

[21] Appl. No.: 887,889

[22] Filed: Mar. 20, 1978

[30] Foreign Application Priority Data

Apr. 2, 1977 [DE] Fed. Rep. of Germany ....... 2714912

[51] Int. Cl.² .............................. B60J 9/02; B60J 7/22
[52] U.S. Cl. ...................................... 296/178; 296/68; 105/430; 297/15; 182/15
[58] Field of Search .............. 296/28 A, 63, 64, 65 R, 296/66, 68, 69; 105/430; 297/15, 217; 182/33, 115, 116

[56] References Cited

U.S. PATENT DOCUMENTS

| | | | |
|---|---|---|---|
| 3,011,585 | 12/1961 | Hamilton | 182/33 |
| 4,076,302 | 2/1978 | Sable | 296/65 R |

FOREIGN PATENT DOCUMENTS

| | | | |
|---|---|---|---|
| 1755807 | 8/1971 | Fed. Rep. of Germany | 296/28 A |
| 742215 | 12/1955 | United Kingdom | 296/28 A |

Primary Examiner—Richard A. Bertsch
Attorney, Agent, or Firm—W. G. Fasse; D. F. Gould

[57] ABSTRACT

A multi-passenger vehicle such as a bus has a lateral entry and exit door which opens a stairwell. One or more passenger seats are arranged immediately adjacent to the stairwell. The passenger seat is oriented in such a manner relative to the longitudinal axis of the bus that the passenger either faces in the travel direction or in the opposite direction. A foot rest plate covers the stairwell when the door is closed. The foot rest plate is hinged about a horizontal axis extending across the longitudinal axis of the bus. In the upwardly tilted position the foot rest plate does not interfere with the free use of the stairwell for its purpose and in the closed position the foot rest plate makes the particular seat adjacent to the stairwell as comfortable as any other seat in the bus.

9 Claims, 2 Drawing Figures

ENTRANCE STRUCTURE FOR A MULTI-PASSENGER VEHICLE

BACKGROUND OF THE INVENTION

The present invention relates to an entrance structure for a multi-passenger vehicle such as a bus having a lateral entrance and/or exit. The entrance includes a stairwell as well as passenger seats arranged immediately adjacent to the stairwell, more specifically, immediately behind the stairwell as viewed in the travel direction of the vehicle. The seat or seats are so arranged that the passenger faces in the travel direction or in the opposite direction.

Multi-passenger vehicles of the above described type, especially buses used for cruise purposes have at least one and frequently several seats which are rather undesirable from the passenger's point of view because the seats are arranged so close to a stairwell next to a door that the passenger does not have a convenient or comfortable footrest. Except where a footrest bar is provided, the passenger assigned to such a seat is usually left with practically no footrest at all so that the passenger's legs will dangle downwardly into the stairwell which is not comfortable, especially on a trip of longer duration.

Another disadvantage of this particular seat resides in the fact that it is subject to a substantial noise nuisance which is due to the fact that the stairwell is normally insufficiently insulated against noise which is generated in the chassis and wheels as the vehicle travels. These disadvantages have been known for a long time. Nevertheless, so far no improvement for the removal of the just mentioned disadvantages has been disclosed.

Although the above mentioned footrest bar is known, such bars are not convenient because they are normally attached on the backside of the seat which is located immediately in front of the stairwell. Thus, the passenger occupying the seat immediately behind the stairwell can rest his feet on this footrest bar only if his legs are long enough to bridge the stairwell. This type of footrest accordingly provides only a very slight improvement of the travel comfort for a passenger occupying the problem seat and is not available at all for short persons and even tall persons having long legs do not find it comfortable to bridge the stairwell with their legs.

OBJECTS OF THE INVENTION

In view of the above, it is the aim of the invention to achieve the following objects, singly or in combination:

to construct a multi-passenger vehicle as described above in such a manner that a comfortable footrest is provided for the passenger occupying the seat immediately adjacent to the stairwell regardless whether the passenger faces in the travel direction or in the direction opposite to the travel direction of the vehicle;

to provide a cover door for the stairwell of a bus which will make the adjacent seat or seats as comfortable as any other seat in the bus while also avoiding any interference with the free use of the stairwell for entry and exit;

to arrange the footrest plate in such a manner that it closes the stairwell substantially at the floor level of the bus, whereby the closure door simultaneously acts as a noise insulator;

to arrange a footrest plate just above the stairwell of a bus in such a manner that it is hinged like a horizontally arranged door; and to construct the cover for the stairwell of a bus in such a manner that mechanical or pneumatic balancing elements will assure that the cover will be tilted upwardly automatically each time when a passenger leaves the seat adjacent to the stairwell.

SUMMARY OF THE INVENTION

According to the invention there is provided a multi-passenger vehicle having a lateral entrance with a stairwell which is covered with a foot rest plate when the stairwell is not used so that the passenger occupying the seat immediately adjacent to the stairwell is provided with a comfortable foot rest. The footrest plate covers the top of the stairwell, preferably at the floor level of the vehicle and is tiltable or hinged about a horizontal axis extending perpendicularly to the travel direction of the vehicle. When the footrest plate is tilted into the upward position so that the stairwell is free to be used for its intended purpose of entering and leaving the vehicle.

It is an advantage of the invention that the passenger occupying the seat immediately adjacent to the stairwell, especially the seat immediately behind the stairwell as viewed in the forward travel direction of the vehicle, has now the same travel comforts as a passenger on any other seat. Thus, it is now not necessary any more to allocate passengers with especially long legs to this particular seat. Yet another advantage of the invention is seen in that noise which heretofore entered into the passenger compartment of the vehicle through the stairwell is substantially dampened. On the other hand, the footrest plate does not obstruct the stairwell because it may simply be tilted upwardly into a substantially vertical position thereby providing access to the entire stairwell.

BRIEF FIGURE DESCRIPTION

In order that the invention may be clearly understood, it will now be described, by way of example, with reference to the accompanying drawings, wherein:

FIG. 1 is a somewhat schematic side view into the stairwell of a multi-passenger vehicle, whereby the view direction extends perpendicularly to the travel direction of the vehicle; and FIG. 2 is a sectional view along section line II—II in FIG. 1, whereby the view direction extends in the travel direction of the vehicle.

DETAILED DESCRIPTION OF PREFERRED EXAMPLE EMBODIMENTS

Figure 1:
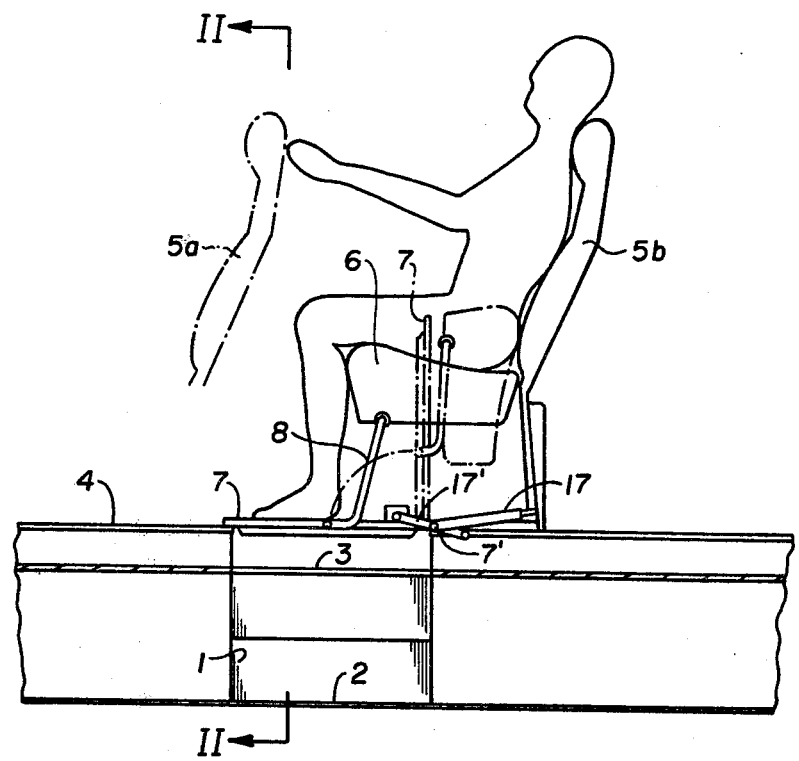

FIG. 1 shows a side view into a multi-passenger vehicle, such as a so-called cruiser bus with the side wall of the bus removed to show the details of a lateral entrance including a stairwell 1. The stairwell 1 leads from the lowest step 2 to the level of the center gangway 3. A platform 4 extends somewhat above the gangway 3 and to the right and left thereof substantially along the entire length of the vehicle. The passenger seats 5a and 5b are secured to the platform 4. As viewed in the travel direction of the vehicle which is from right to left in FIG. 1, the seat 5b is located immediately behind above the stairwell 1. This seat is provided with a seating cushion 6 tiltable into a vertical position as shown in dash dotted lines in FIG. 1.

According to the invention, a footrest plate 7 is hinged at 7' to the floor immediately adjacent to the stairwell 1. The hinge axis of the hinge 7' extends horizontally and across the travel direction of the vehicle. The footrest plate 7 is connected to a tilting lever 8 having the specific shape shown in FIG. 1, and the seating cushion 6 is operatively connected to the upper end of the tilting lever 8. The connection of the cushion 6 and the footrest plate 7 through the lever mechanism 8 is such that a tilting of the cushion 6 into the dash dotted position shown in FIG. 1 automatically also brings the footrest plate 7 into the vertical position, also as shown by the dash dotted lines in FIG. 1. For this purpose, the lower end of the lever 8 is pivoted to the sides of the footrest plate 7 substantially intermediate the ends of the footrest plate 7.

In the illustrated well closing position of the footrest 7 shown in full lines in FIG. 1, the footrest 7 completely closes the stairwell 1 at the upper edge thereof. Thus, the left-hand edge of the plate 7 rests on the edge of the next adjacent platform portion 4. It will be noted from FIG. 1 that the person sitting on the seating cushion 6 is able to conveniently rest the feet on the cover plate 7 with sufficient space in front of the passenger toward the next adjacent seat 5a shown in dash-dotted lines in FIG. 1.

In order to facilitate the lifting of the feet resting plate 7 simultaneously with the cushion 6 of the passenger seat 5b, a weight balancing mechanism 17 is connected to the seat and plate structure. The weight balancing mechanism 17 may, for example, comprise a conventional shock absorber, including a piston cylinder arrangement.

The invention, however, may also be realized without interconnecting the cushion 6 with the feet resting plate 7. Thus, if the cushion 6 should separately be tiltable into the dash dotted position shown in FIG. 1, the cushion as well as the plate 7 may be provided with their respective separate weight balancing devices to facilitate the tilting movement into the upward or vertical position to clear the stairwell 1. If the cushion 6 is not tiltable, the entire seat 5b will be placed sufficiently to the right in FIG. 1 so as not to interfere with the upward tilting of the footrest plate 7.

Figure 2:
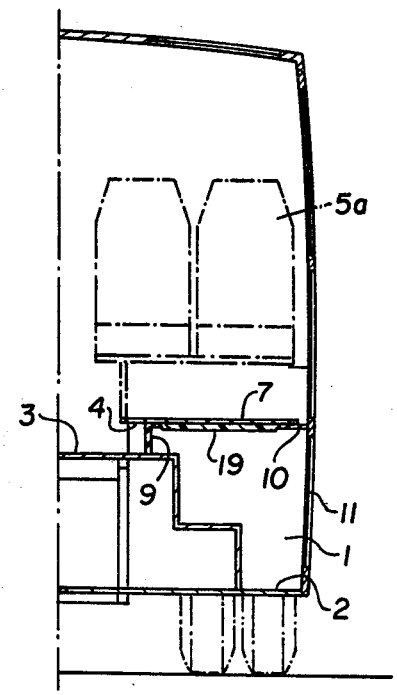

Referring to FIG. 2, the same reference numbers are employed as in FIG. 1. The footrest plate 7 is provided with sealing gaskets, for example, of rubber. These gaskets or lips 9 and 10 extend along the edges of the plate 7 in a direction perpendicular to the hinging axis 7'. The sealing gasket 9 along the edge of the plate 7 adjacent to the gangway 3 is a downwardly extending lip which closes the opening between the footrest plate 7 and the top of the last thread which is level with the gangway 3. Thus, the stairwell is closed entirely along the gangway by the lip 9. The lip 10 on the opposite edge adjacent to the door 11 may also be made of rubber or neoprene or any other suitable material for covering the gap between the door or vehicle wall on the one hand, and the plate 7. Thus, the arrangement of the sealing rubber lips 9 and 10 completely seals off the stairwell 1 from the passenger compartment, especially adjacent to the passenger seat 5b. To improve the noise absorption qualities of the plate 7 a foam rubber layer 19 or the like may be secured to the lower surface of the plate 7 facing into the stairwell 1.

With regard to the weight balancing devices 17 it should be noted that it not only facilitates the lifting of the seat cushion 6 and the plate 7, but it also maintains the two elements 6 and 7 in the dash-dotted position when the seat is not occupied. The weight balancing mechanism 17 may be of a mechanical or pneumatic type, both of which are well known in the art so that a detailed illustration is not necessary. Further, the lever arrangement with the lever 17' is preferably such that the seat and foot plate are automatically lifted into the upright, dash-dotted position when a passenger leaves the seat 5b position, whereby the stairwell 1 is automatically open for its intended use.

Due to the lever linkage 8 between the seat 6 and the plate 7 both may be operated simultaneously. This arrangement has the advantage that the footrest plate 7 does not tilt upwardly when the passenger merely lifts his feet without actually intending to leave his seat. The linkage 8 will keep the plate 7 closed as long as the seat is occupied, thus obviating the need for a separate locking mechanism for the plate 7.

Another advantage of this arrangement is seen in that only one weight balancing mechanism 17 is necessary where the seat 6 and the plate 7 are linked by the lever mechanism 8.

However, the weight balancing mechanism may also be connected to the seat 6 rather than to the plate 7. This type of arrangement may even be more economical.

The above described noise absorbing rubber lips 9 and 10, as well as the noise dampening layer 19 seal off the stairwell 1 substantially completely from the passenger compartment, whereby noise generated in the undercarriage of the vehicle is substantially prevented from entering into the passenger compartment through the stairwell 1.

The rubber lips 9 and 10 have the advantage that the plate 7 itself does not have to reach directly into contact with the door or with the gangway 3. The rubber lip 10 bridges the gap between the plate 7 and the door and simultaneously prevents damage to the door when the plate 7 is tilted up or down. The spacing between the plate 7 and the wall or door of the passenger compartment will be selected so that the rubber lip 10 can easily slide along the inner surface of the walk or door. The arrangement of the rubber lip 9 has the advantage that it will hang down by gravity when the plate 7 is in its well closing position, thereby closing the opening resulting from the fact that the seats are positioned on a platform 4 which is somewhat higher than the level of the gangway 3.

Another advantage of the rubber lips 9 and 10 and the noise absorbing layer 19 is seen in that it prevents the plate 7 from vibrating, thereby avoiding discomfort to the passenger.

Although the invention has been described with reference to specific example embodiments, it is to be understood, that it is intended to cover all modifications and equivalents within the scope of the appended claims.

What is claimed is:

1. An entrance structure for a multi-passenger vehicle comprising a passenger compartment including floor means and a longitudinal axis, a stairwell leading into said passenger compartment, seat means arranged adjacent to the stairwell and in said passenger compartment and oriented so that a passenger's legs would be located above the stairwell, plate means adapted to cover said stairwell, said plate means being adapted to form part of said floor means, hinge means operatively securing said plate means to said floor means adjacent to said seat means, said hinge means having a hinging axis extending substantially across to said longitudinal vehicle axis, whereby said plate means are tiltable upwardly toward said seat means for opening said stairwell for its intended use, and whereby a passenger sitting on said seat means may rest his feet on top of said plate means when the latter is in the stairwell closing position.

2. The structure of claim 1, further comprising level means operatively secured to said plate means, and weight balancing means secured in said passenger compartment and to said lever means for facilitating the upward hinging of said plate means.

3. The structure of claim 1, wherein said seat means comprise upwardly, tiltable, seating cushion means, said structure further comprising hinging lever means (8) operatively interconnecting said plate means and said upwardly tiltable seating cushion means for the simultaneous upward tilting of the seating cushion means and of the plate means.

4. The structure of claim 3, wherein said hinging lever means have an inherent spring bias, whereby said seating cushion means and said plate means are automatically and simultaneously tilted upwardly when the seating cushion means is unoccupied.

5. The structure of claim 1, further comprising weight balancing means operatively connected to said seat means for automatically tilting the seat means into a vertical position when the seat means is unoccupied.

6. The structure of claim 1, further comprising sealing means as part of said plate means for tightly closing said stairwell.

7. The structure of claim 6, wherein said sealing means comprise elastic sealing strip means extending along the edges of said plate means substantially perpendicularly to said hinging axis.

8. The structure of claim 1, further comprising noise absorbing means operatively secured to said plate means.

9. The structure of claim 1, wherein said noise absorbing means comprise a layer of foam material secured to the under surface of said plate means.

* * * * *

UNITED STATES PATENT OFFICE
CERTIFICATE OF CORRECTION

Patent No. 4,167,286   Dated September 11, 1979

Inventor(s) Ludwig Geyer

It is certified that error appears in the above-identified patent and that said Letters Patent are hereby corrected as shown below:

In the Claims:   Claim 2, line 1, replace "level" by --lever--.

Signed and Sealed this

Twentieth Day of November 1979

[SEAL]

Attest:

RUTH C. MASON
Attesting Officer

LUTRELLE F. PARKER
Acting Commissioner of Patents and Trademarks